No. 677,871. Patented July 9, 1901.
J. P. LAVIGNE.
SCREW MACHINE.
(Application filed July 19, 1900.)
(No Model.) 12 Sheets—Sheet 1.

Witnesses.
Joseph P. Lavigne.
Inventor.
By Attys Seymour & Earle

No. 677,871.  
J. P. LAVIGNE.  
SCREW MACHINE.  
(Application filed July 19, 1900.)

(No Model.)

Patented July 9, 1901.

12 Sheets—Sheet 3.

No. 677,871.

J. P. LAVIGNE.
SCREW MACHINE.
(Application filed July 19, 1900.)

(No Model.)

Patented July 9, 1901.

12 Sheets—Sheet 4.

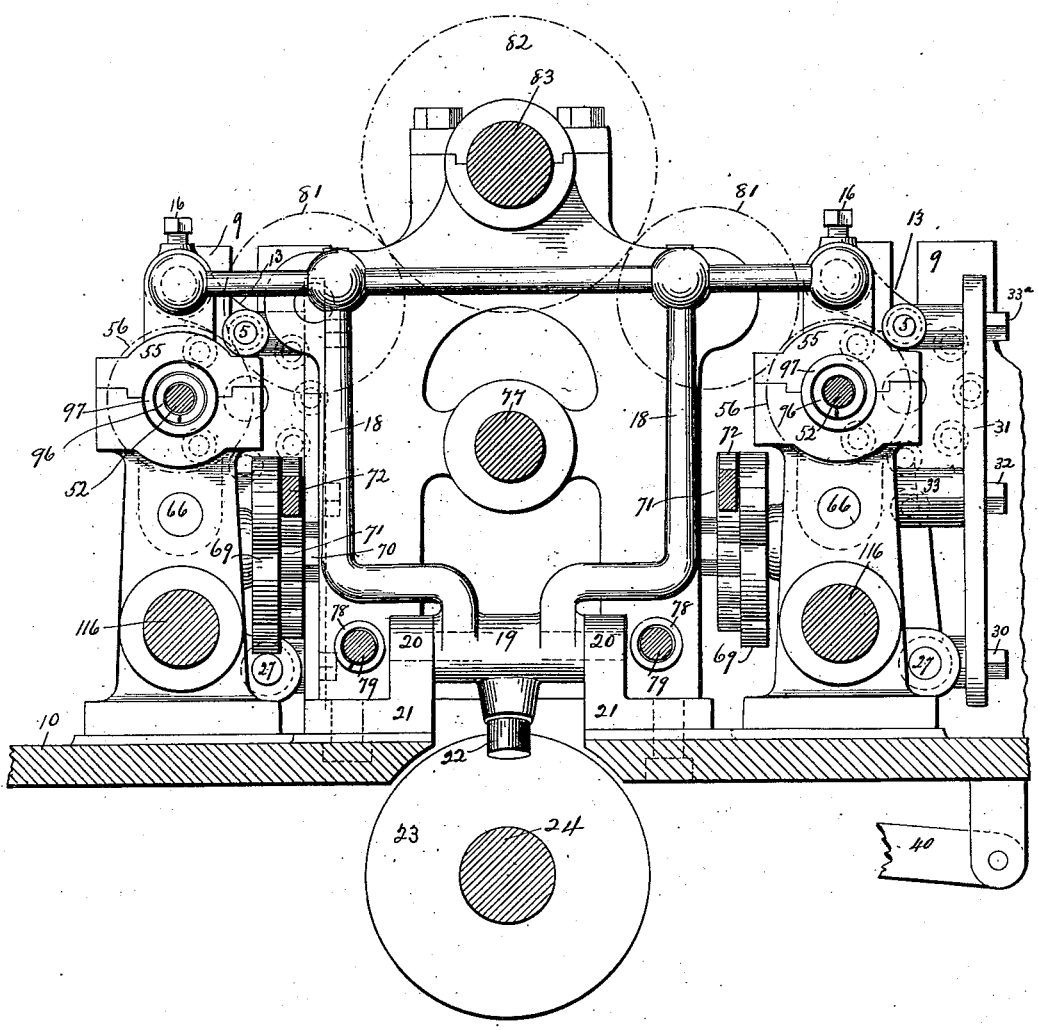

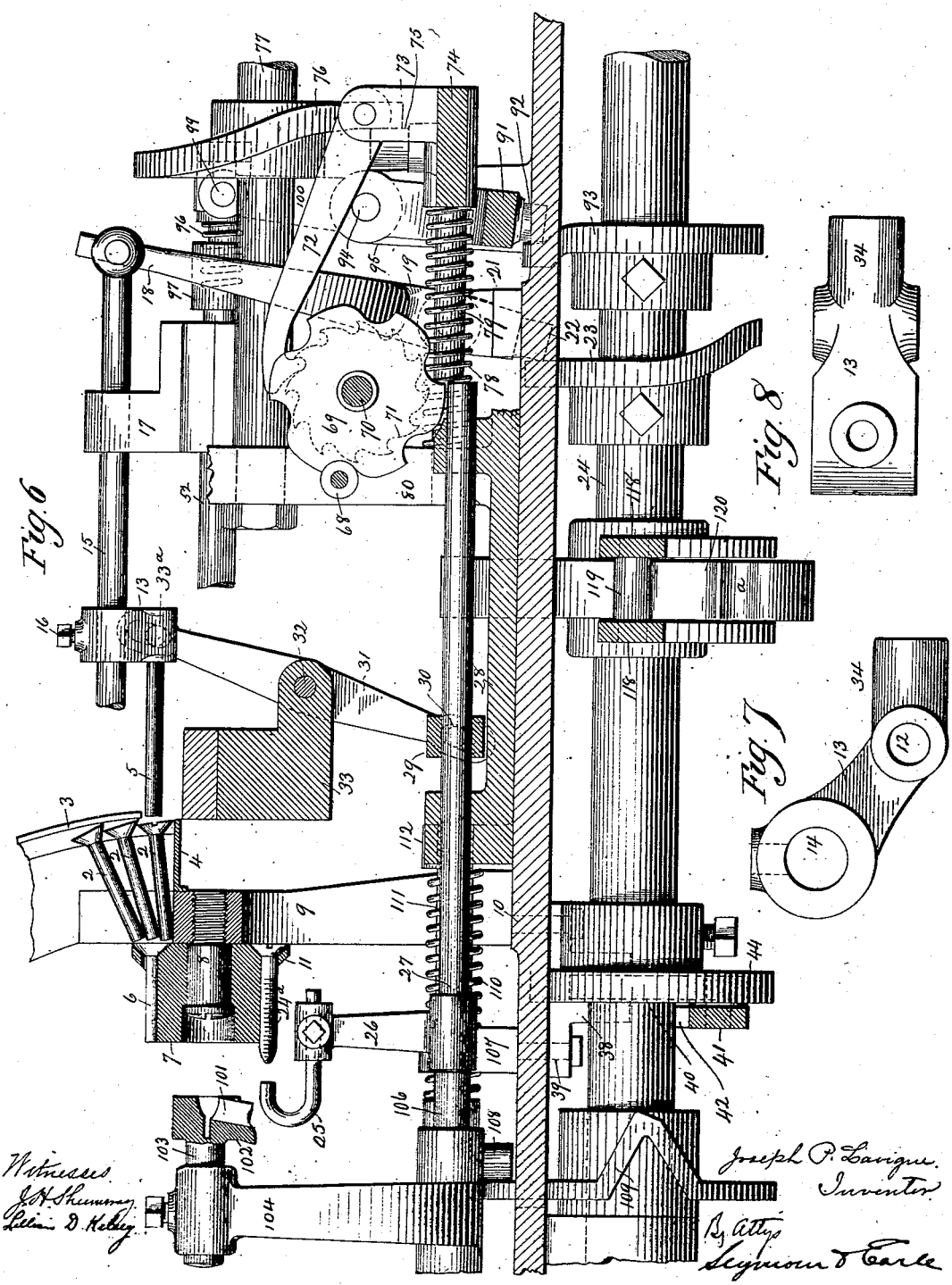

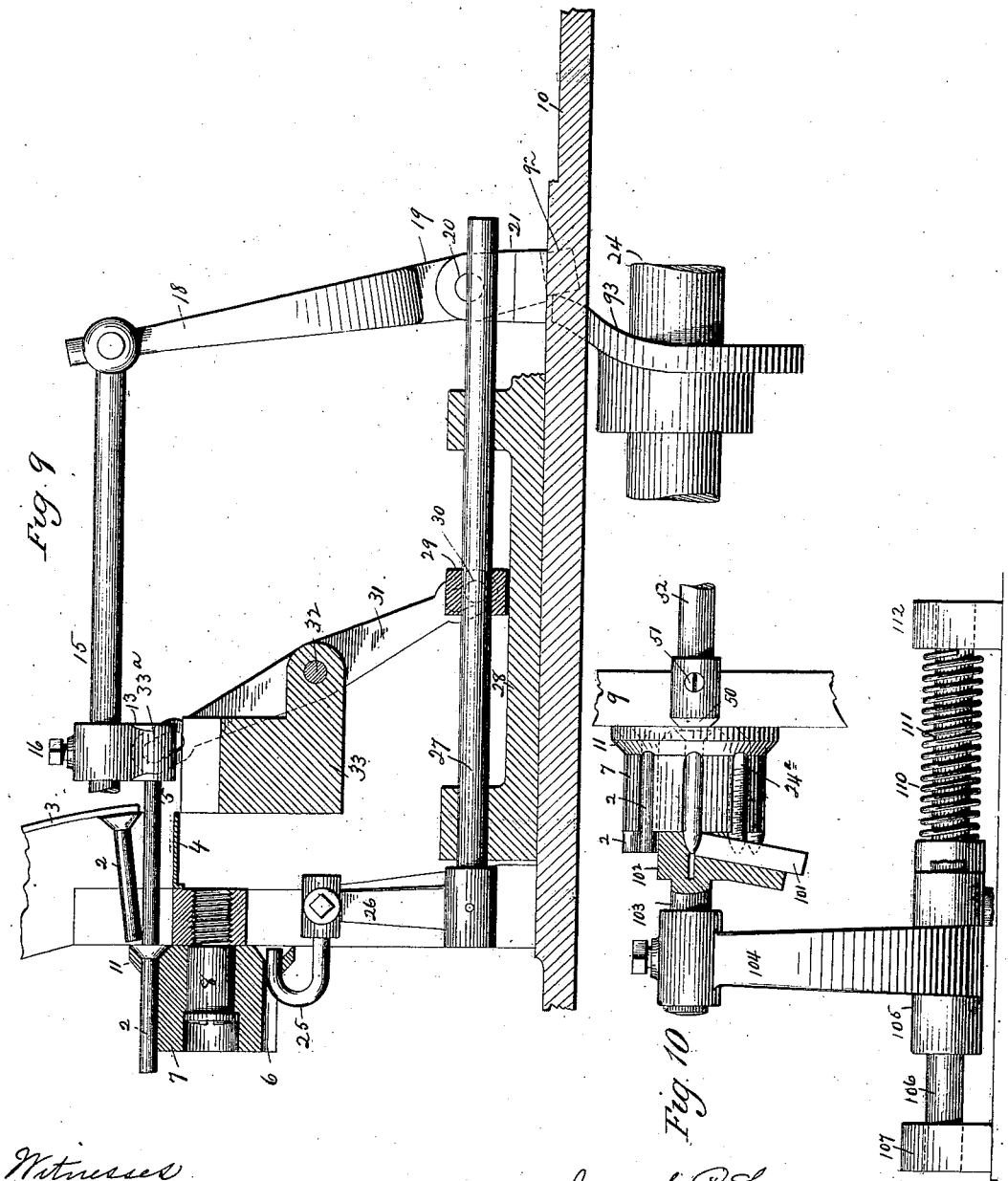

No. 677,871. Patented July 9, 1901.
J. P. LAVIGNE.
SCREW MACHINE.
(Application filed July 19, 1900.)
(No Model.) 12 Sheets—Sheet 8.
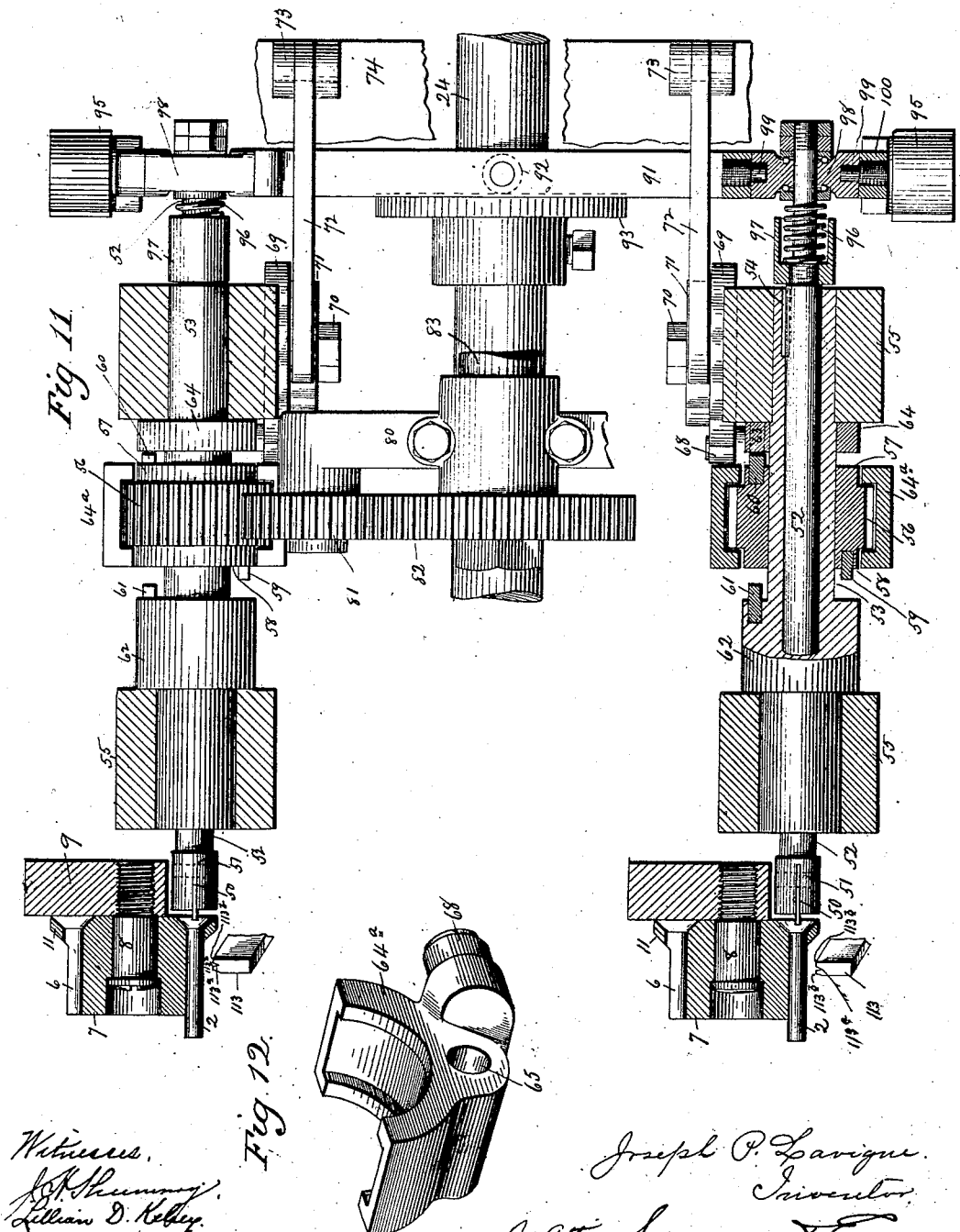

No. 677,871. Patented July 9, 1901.
J. P. LAVIGNE.
SCREW MACHINE.
(Application filed July 19, 1900.)
(No Model.) 12 Sheets—Sheet 9.

Witnesses.
Joseph P. Lavigne,
Inventor.
By Attys Seymour & Earle

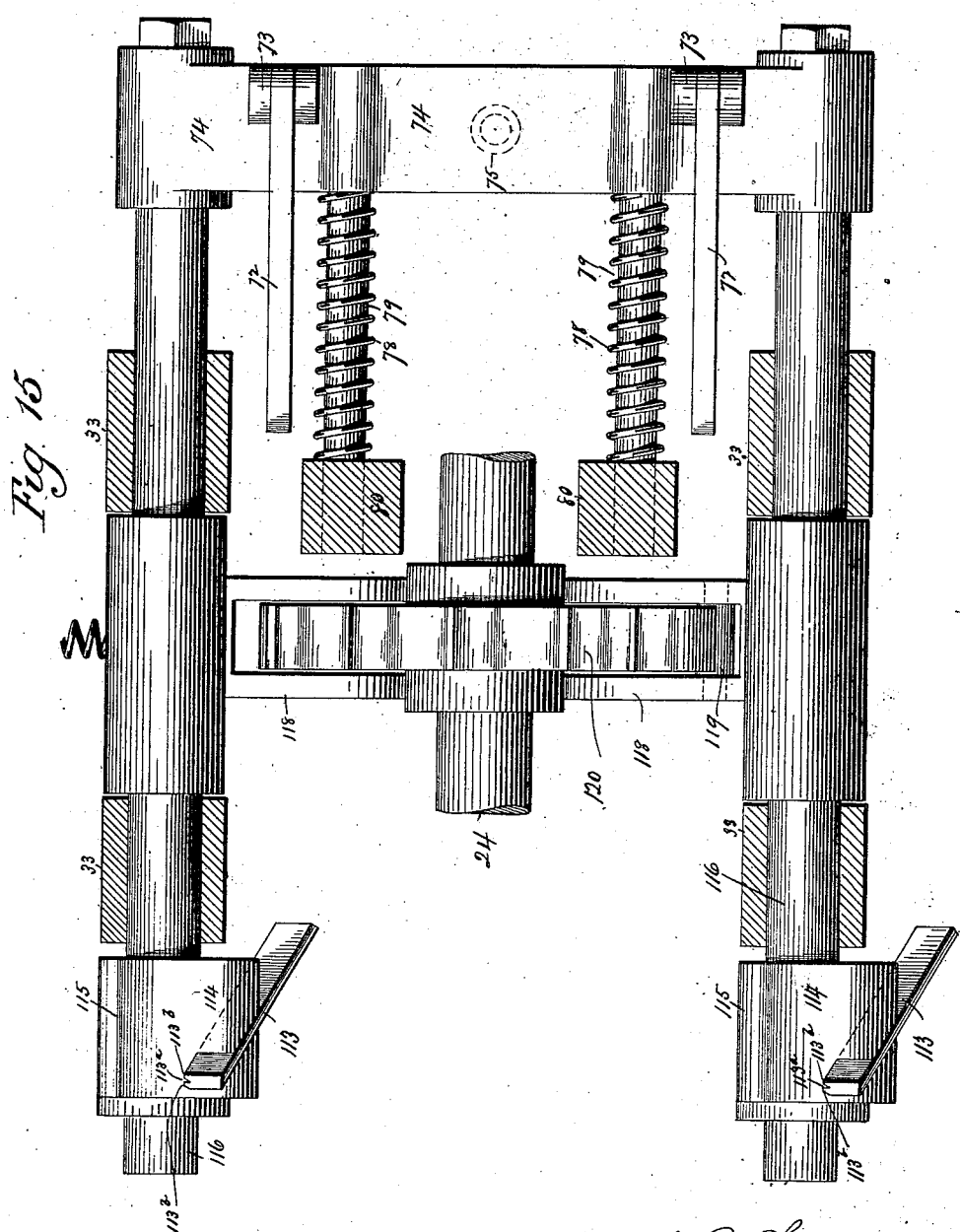

No. 677,871. Patented July 9, 1901.
J. P. LAVIGNE.
SCREW MACHINE.
(Application filed July 19, 1900.)
(No Model.) 12 Sheets—Sheet 11.
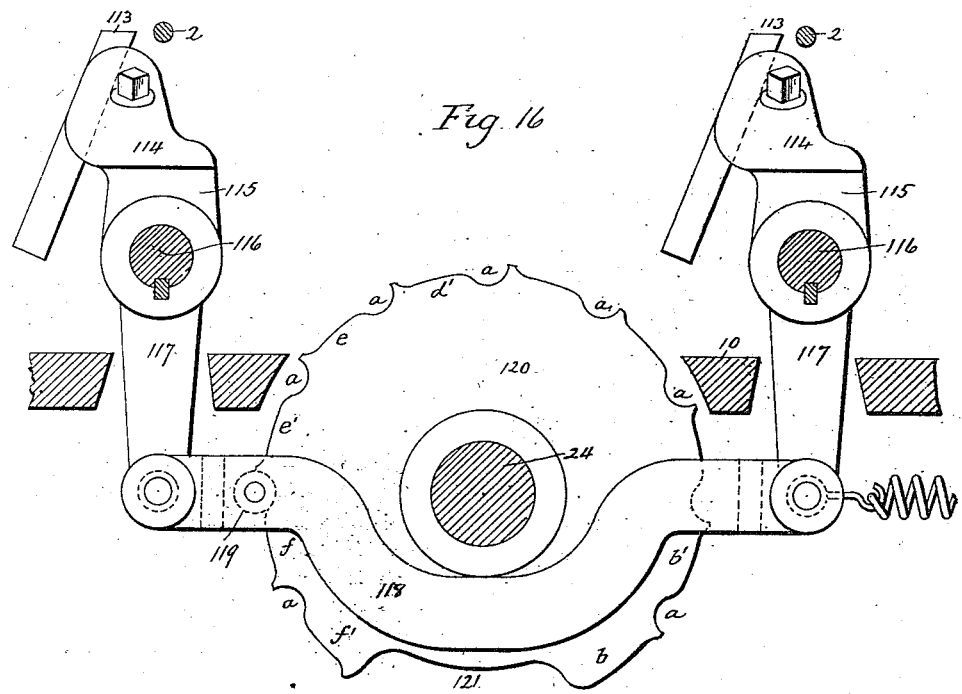
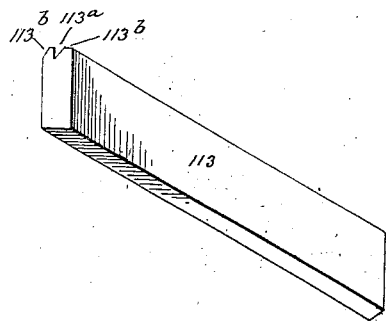
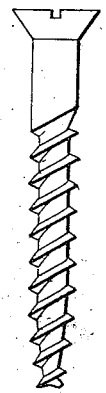
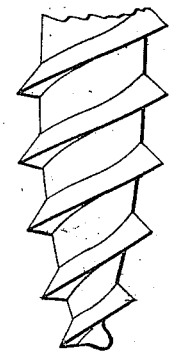
Witnesses
Joseph P. Lavigne
Inventor
By Attys. Seymour & Earle No. 677,871. Patented July 9, 1901.
J. P. LAVIGNE.
SCREW MACHINE.
(Application filed July 19, 1900.)
(No Model.) 12 Sheets—Sheet 12.

Witnesses.

Joseph P. Lavigne
Inventor
By Attys Seymour & Earle

UNITED STATES PATENT OFFICE.

JOSEPH P. LAVIGNE, OF NEW HAVEN, CONNECTICUT, ASSIGNOR TO WESLEY S. BLOCK, OF NEW YORK, N. Y.

SCREW-MACHINE.

SPECIFICATION forming part of Letters Patent No. 677,871, dated July 9, 1901.

Application filed July 19, 1900. Serial No. 24,231. (No model.)

*To all whom it may concern:*

Be it known that I, JOSEPH P. LAVIGNE, of New Haven, in the county of New Haven and State of Connecticut, have invented a new Improvement in Screw-Machines; and I do hereby declare the following, when taken in connection with the accompanying drawings and the characters of reference marked thereon, to be a full, clear, and exact description of the same, and which said drawings constitute part of this specification, and represent, in—

Figure 1:
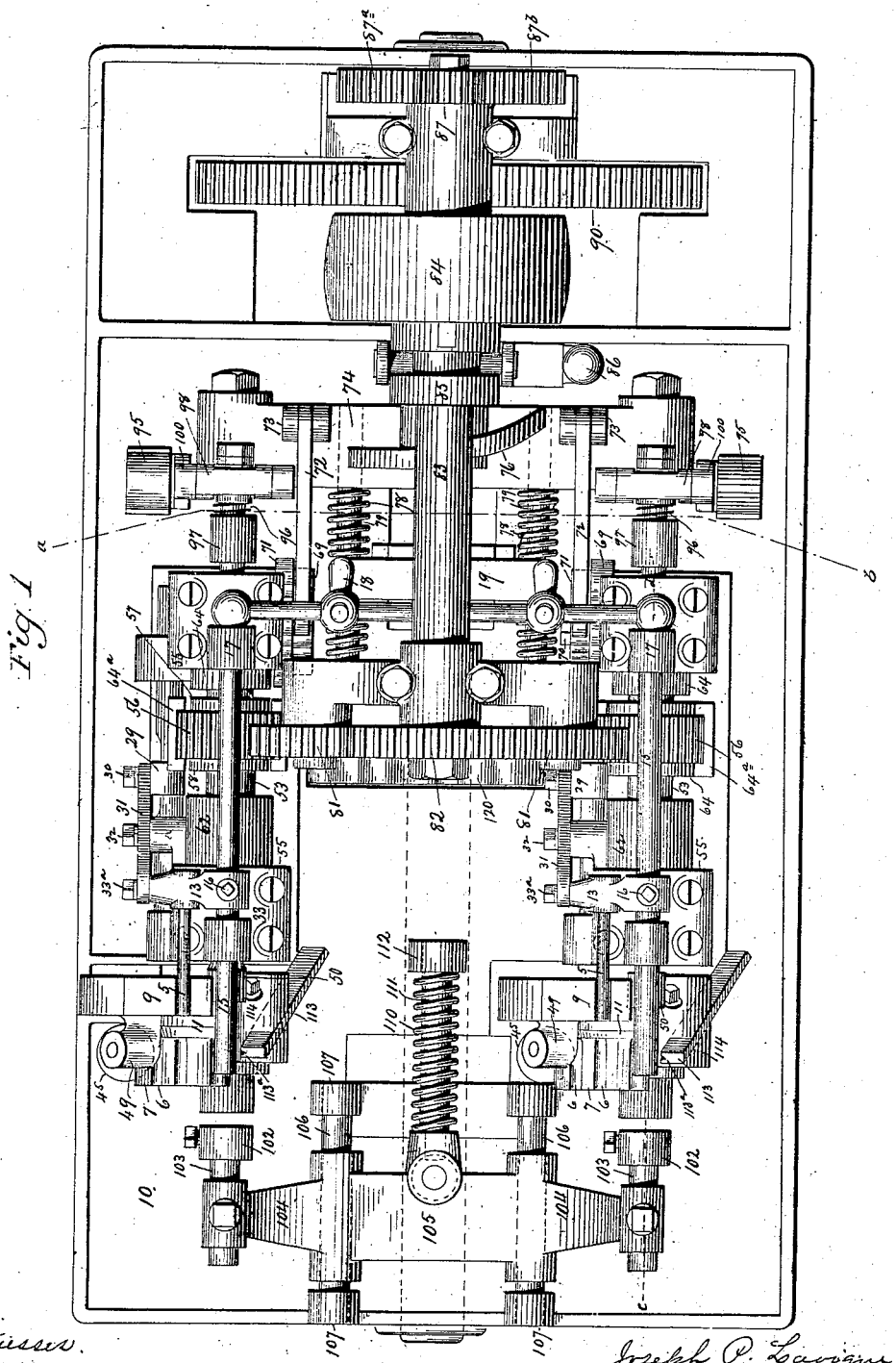
Figure 2:
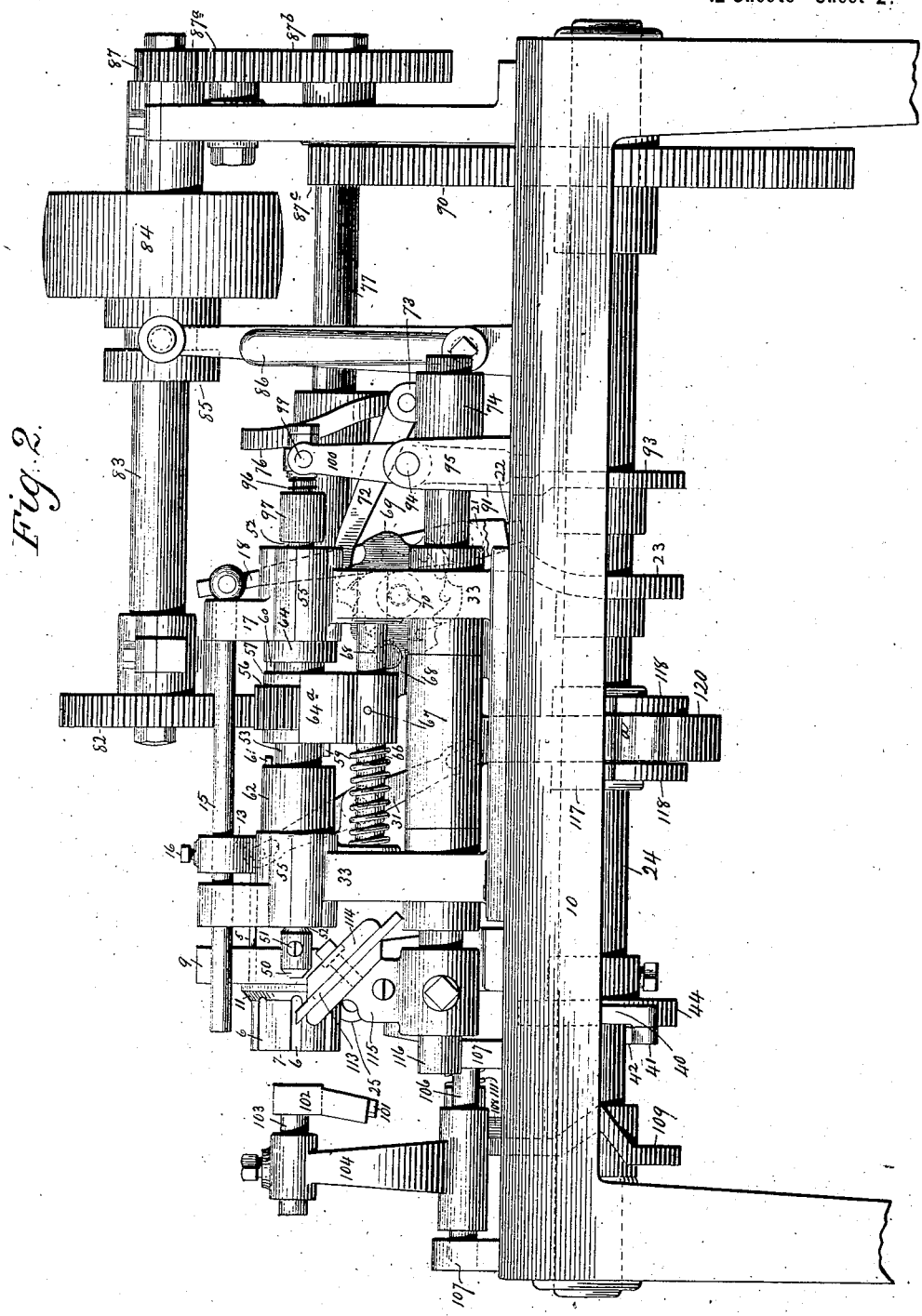
Figure 3:
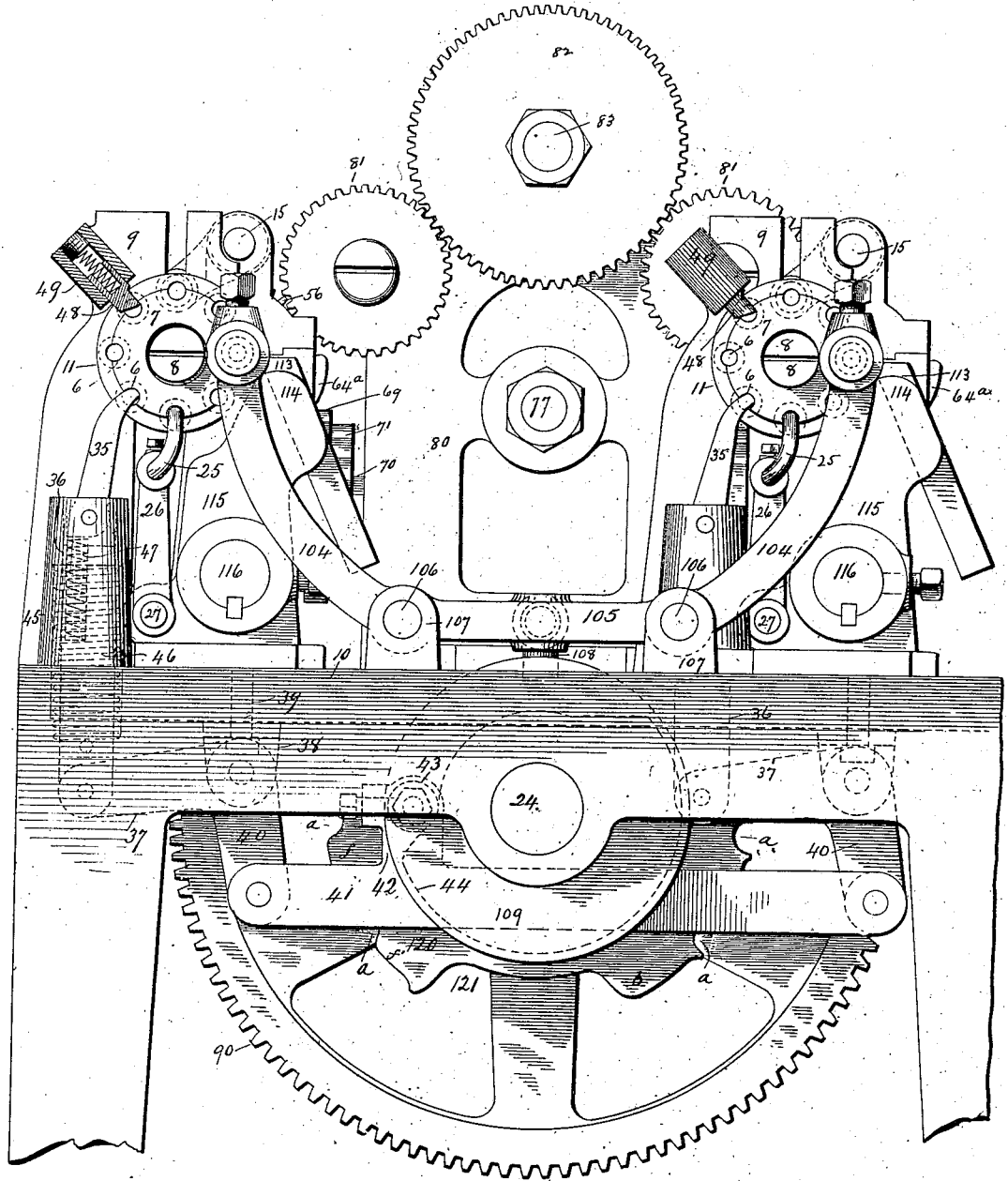
Figure 4:
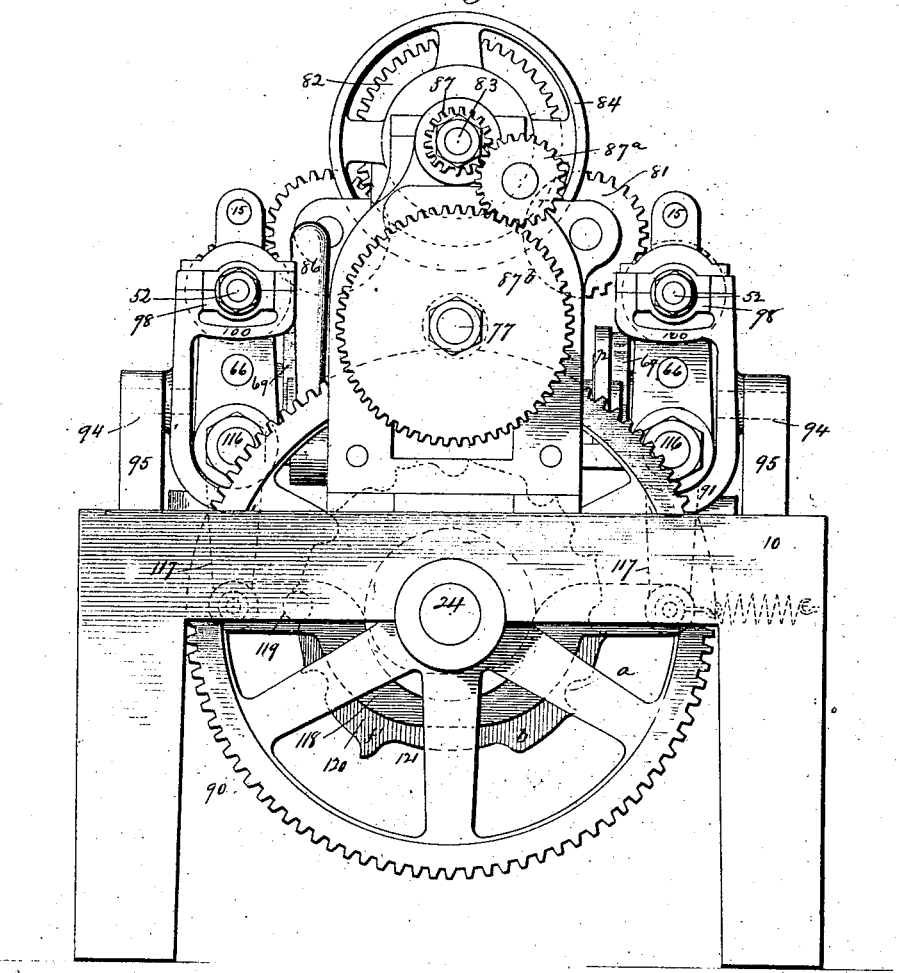
Figure 13:
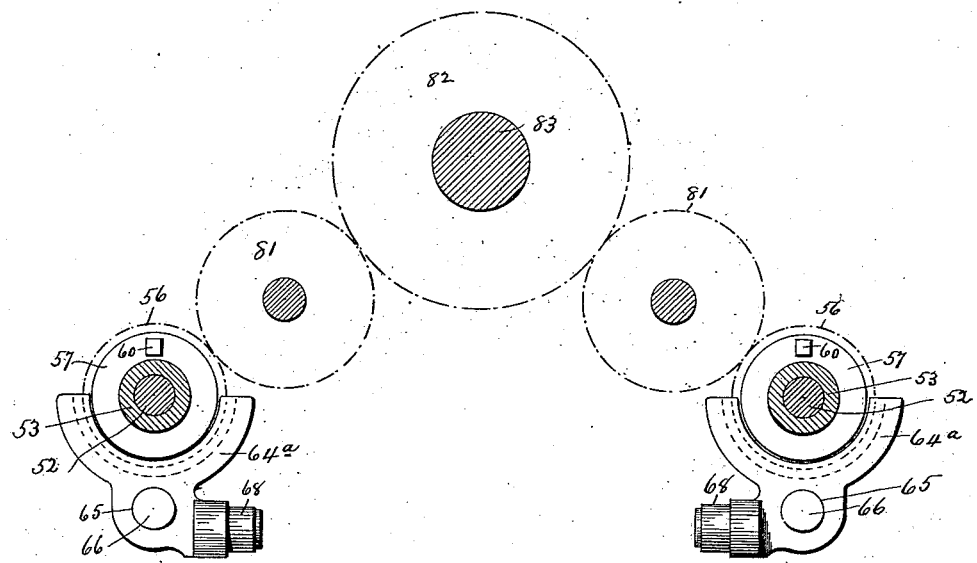
Figure 14:
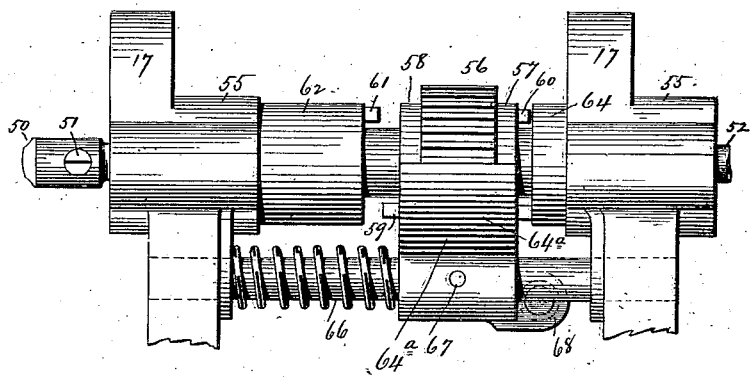
Figure 17:
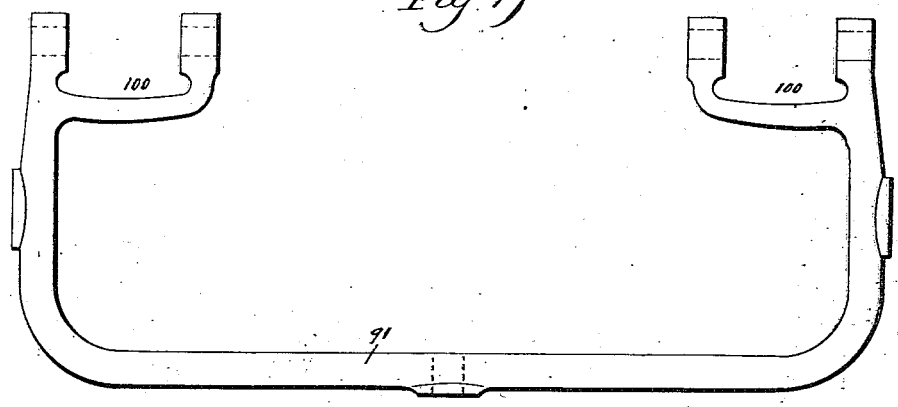
Figure 18:
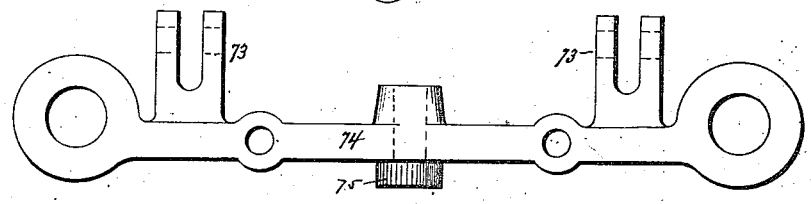

Figure 1, a plan view of my improved machine; Fig. 2, a view of the machine in side elevation; Fig. 3, a view of the machine in front elevation; Fig. 4, a view of the machine in rear elevation; Fig. 5, a view of the machine in vertical transverse section on the line *a b* of Fig. 1; Fig. 6, a broken view of the machine, partly in elevation and partly in vertical longitudinal section, on the line *c d* of Fig. 1, this view showing a blank in position to be inserted and a finished screw in position to be ejected; Fig. 7, a detached view, in side elevation, of one of the coupling-links employed to connect the feeding and ejecting instrumentalities of the machine; Fig. 8, a plan view of the coupling-link; Fig. 9, a view similar to Fig. 6, but less comprehensive, showing the reversed positions of the instrumentalities employed for feeding and ejecting the blanks and finished screws; Fig. 10, a detail view, partly in side elevation and partly in section, showing the combined blank-carrier and back-rest and the cutter employed for pointing the blanks; Fig. 11, a detail view, partly in plan and partly in horizontal section, showing the means employed for rotating the blanks; Fig. 12, a detached perspective view of the gear-cradle constituting an element of the mechanism employed for varying the number of threads; Fig. 13, a view in elevation, showing the train of gears employed for driving the shafts carrying the screw-drivers which rotate the blanks; Fig. 14, a detail view, in side elevation, showing one of the gear-cradles and the parts connected with it; Fig. 15, a detail view of the machine, partly in plan and partly in horizontal section, showing the thread-cutters and the means for reciprocating the same; Fig. 16, a detail view, in broken vertical section, showing the thread-cutters and the means employed for oscillating the same, including the cutter-oscillating cam; Fig. 17, a detached view of the rocking frame employed for reciprocating the screw-driver shafts; Fig. 18, a detached view in elevation of the reciprocating frame which reciprocates the thread-cutter rods and which carries the pawls employed for operating the gear-cradles of the blank-rotating mechanism; Fig. 19, a detached perspective view of one of the thread-cutters; Fig. 20, a view in side elevation of a screw having threads of the kind which the particular machine shown is adapted to cut; Fig. 21, a broken view of the point of this screw, enlarged to better show the character of the threads.

My invention relates to an improvement in wood-screw machines, the object being to produce a comparatively simple machine constructed with particular reference to increased capacity for work and to adjustment for varying the pitch and number of threads in the screws produced.

With these ends in view my invention consists in certain details of construction and combinations of parts, as will be hereinafter described, and pointed out in the claims.

The machine chosen by me for the purpose of illustrating my invention is a double machine in the sense that the blank feeding and cutting instrumentalities are duplicated and arranged so as to be driven from the same power connections, whereby the capacity of the machine is increased. It is apparent, however, that a single set of blank feeding and cutting instrumentalities might be employed. I should also mention that the machine chosen by me for the purpose of illustrating my invention is adapted for the production of the screw known as the "Caldwell" screw and described in United States Patent No. 635,297, granted October 24, 1899. Inasmuch as the several parts of the two sets of blank feeding and cutting instrumentalities are duplicates of each other, I shall for the sake of convenience describe only one set of them, but designate all of the corresponding parts by corresponding numbers and letters. In describing the machine I shall, as far as possible, take up its instrumentalities in the order of succession of their operation upon the screw-blanks.

The screw-blanks 2 are fed in bulk into any suitable hopper, (not shown,) from which they are conducted in a vertical column through a chute 3, from the lower end of which they emerge, so as to rest upon a horizontal table 4, from which they are pushed inward by a feeding-rod 5 into peripheral chambers 6, formed in a heavy cylindrical combined carrier and back-rest 7, arranged in a horizontal position and rotating upon a heavy screw-stud 8, entered into an upright 9, secured to the bed 10 of the machine. The chambers 6 may vary in number; but they are always located at equal distances apart and at the same distance from the center of the carrier 7, which is formed at its inner end with a flange 11, through which the said chambers 6 enter, as it were, the part 7. The said chambers have their extreme inner ends enlarged by countersinking the inner end of the part 7 for the reception of the heads of the screw-blanks, the heads and necks of which are confined within the said flange, which thus provides for holding the blanks in place in the part 7 without the use of separate blank-holding devices. The said chambers 6 are, however, laterally or radially open from the point of their emergence into the outer face of the flange through to the extreme outer end of the part 7. Throughout the open portion of the chambers they are virtually semicylindrical in cross-section, being centrally intersected by the radii of the part 7 and constituting anvils or supports for taking the radially-inward thrust or pressure imposed upon the blanks while the same are having screw-threads cut in them, as will be hereinafter described. In length the combined carrier and back-rest is shorter than the screw-blanks, the ends of which will project beyond its outer end for a sufficient distance to be acted upon by a pointing instrument, as will also be described later on.

The horizontal feeding-rod 5 is rigidly secured at its outer end in a hole 12, formed in a coupling-link 13, Figs. 7 and 8, which is formed with a hole 14, adapting it to be mounted upon a horizontal operating-rod 15, upon which it is adjustably secured by means of a set-screw 16. The said rod 15 reciprocates in a frame 17, bolted to the bed 10 of the machine, and is pivotally connected at its outer end with the upper end of one of the two corresponding arms 18 of a rocking yoke 19, Fig. 5, hung upon screw-pivots 20 20 in brackets 21 21, bolted to the said bed 10. The said yoke 19 is provided at the center of its extreme lower end with an antifriction-roll 22, which is acted upon by the combined feeding and ejecting cam 23, mounted upon the cam-shaft 24. At the same time that a blank 2 is being fed in one direction into the carrier 7 by the rod 5 a finished screw $24^a$ is positively ejected in the opposite direction from the carrier by means of a hook-like ejector 25, adjustably mounted in the upper end of a post 26, secured to the forward end of a reciprocating ejecting-rod 27, having bearing in a bracket 28, secured to the bed 10. The said ejecting-rod carries a small block 29, made fast to it and provided with a screw-stud 30, which passes through a slot formed in the lower end of a coupling-lever 31, which is hung upon a pin 32, located in an upright 33, secured to the bed 10 of the machine. The upper end of the coupling-lever 31 receives in its elongated slot the screw-bolt $33^a$, which is entered into a threaded socket 34, formed in the lower end of the coupling-link 13, whereby the lever 31 is connected with the said link. It will thus be seen that through the coupling-lever 31 the hook-like ejector 25 is operated simultaneously with the feeding-rod 5 and from the same source of power, but in the opposite direction.

The combined carrier and back-rest 7 is actuated in step-by-step rotation by means of a pawl 35, pivoted in the upper end of a plunger 36, the lower end of which is pivotally connected with the arm 37 of a bell-crank lever hung in a bracket 38, secured to the machine-bed 10 by a bolt 39. The other arm 40 of the said lever is connected with one end of a horizontally-arranged operating-lever 41, provided with a bracket 42, carrying an adjustable friction-roller 43, coacting with the carrier-cam 44, which is mounted upon the cam-shaft 24. The plunger 36 is located in a vertical sleeve or housing 45, secured to the machine-bed 10 and receiving also the upper end of a coiled spring 46, encircling the plunger and arranged to exert a constant effort to depress the same, whereby the antifriction-roller 43 is kept in constant contact with the face of the cam 44. A small spring 47, located in a chamber formed for it in the plunger 36, engages with the heel of the pawl 35 for keeping the same in contact with the carrier 7. The upper end of the pawl 35 enters the outer ends of the chambers 6, formed in the carrier 7 for the reception of the screw-blanks. Once during every revolution of the cam 44 the plunger and pawl are lifted, moving the carrier a step. After every movement of the carrier it is locked by means of a spring-catch 48, located in a chambered hub 49, formed integral with the upper end of the upright 9, before mentioned. Every time the cam 44 revolves it also operates to rotate the carrier 7 on the opposite side of the machine through a train of instrumentalities corresponding to those just described, and shown in Fig. 7.

After a screw-blank has been introduced into the carrier 7 and the carrier has been moved twice the head of the blank is brought into position to have its slot entered into by a screw-driver 50, secured by a screw 51 in the forward end of a screw-driver shaft 52, mounted for reciprocation in a sleeve 53, to which it is secured by a key 54, and which runs in bearings 55 55, bolted to the machine-bed 10. For the purpose of producing screws having two independent threads instead of screws having a continuous thread the blank is not rotated continuously, but its rotation is at regular intervals interrupted for a period corresponding to the time required for rotating it through a half-circle and then resumed, and so on, whereby new and oppositely-located surfaces are presented to the thread-cutter 113, which then cuts two independent threads. In other words, at regular intervals the screw-driver shaft skips a half-rotation without any corresponding interruption in the action of the thread-cutter, which thus has new surfaces on the blank presented to it to cut. For the purpose of such interruptions in the rotation of the blank I mount upon the sleeve 53 an annular gear 56, provided upon its opposite faces with annular shoulders 57 58, repectively furnished with clutch-pins 59 and 60, arranged diagonally opposite each other. The said gear 56 is loosely mounted upon the sleeve for longitudinal movement thereupon. When moved forwardly its clutch-pin 59 is brought into engagement with a clutch-pin 61, mounted in a head 62, formed upon the sleeve 53, whereby the sleeve, and hence the shaft 52, is caused to rotate with the gear. On the other hand, when the gear is moved rearwardly upon the sleeve its clutch-pin 60 is engaged with a clutch-pin 63, mounted in a collar 64, brazed upon the sleeve 53, whereby the same is rotated by the gear, causing the shaft 52 to be rotated. Inasmuch as the pins 59 and 60 are located diagonally opposite each other, the gear-wheel must rotate through half a circle between the disengagement of one of its pins with one of the pins 61 and 63 and its engagement with the other. During this half-rotation of the gear-wheel the screw-driver shaft and the screw-driver, and hence the blank, will be at rest. They will, so to speak, "skip" a half-rotation, so that when they are started in rotation again the blank will have, in effect, lost a half-rotation and will present its opposite side to the thread-cutter, which will on that side begin to cut an independent thread, as will be more fully described later on.

To provide for the longitudinal movement of the annular gear 56, I locate it in a cradle 64ª, Fig. 12, the base of which is formed with a hole 65, receiving a horizontally-arranged guiding-rod 66, to which it is secured by a pin 67, Fig. 14, the rod being mounted in the frame 17, which, as shown in Fig. 14, is a double frame and made so on account of the double character of the machine. The cradle 64 is provided with an antifriction-roll 68, which is operated upon by a stepped cradle-cam 69, mounted upon a stud 70, supported in the frame 17 aforesaid. The cam 69 is rotated step by step through the agency of a ratchet-wheel 71, having undercut teeth, which are engaged by the hook-like end of a pawl 72, pivotally mounted in a pair of arms 73, formed at one end of a double reciprocating frame 74, Fig. 18, provided with an antifriction-roll 75, coacting with a cam (the cutter-reciprocating cam) 76, mounted upon an intermediate shaft 77. The cam 76 operates to move the frame 74 forward for the engagement of the pawl 72 with the teeth of the ratchet-wheel 71, which is turned by the rearward movement of the frame 74 under the action of two spiral springs 78 78, encircling spring-rods 79 79, rigidly fastened at their rear ends in the frame 74 and having their forward ends entered so as to play back and forth in the frame-piece 80, Fig. 15. The annular gear 56 is constantly rotated by an intermediate gear 81, Fig. 13, meshing into a driving-gear 82, mounted on the driving-shaft 83, and also meshing into a corresponding gear 81, which in turn drives the gear 56, located in the cradle 64 on the opposite side of the machine. The said driving-shaft 83 is provided with a loose pulley 84, on which the power-belt runs, this pulley being connected with or disconnected from the shaft 83 by means of a suitable clutch 85, connected with an operating-handle 86. At its extreme rear end the driving-shaft 83 is provided with a pinion 87, meshing into an intermediate gear-wheel 87ª, which meshes into a gear-wheel 87ᵇ, mounted upon the intermediate shaft 77, carrying a pinion 87ᶜ, meshing into a large gear-wheel 90, mounted upon the cam-shaft 24. The said screw-driver shaft 52 is moved longitudinally for the purpose of engaging its screw-driver 50 with and disengaging it from the screw-blanks by means of a double rocking frame 91, Fig. 17, provided at its lower end with an antifriction-roll 92, coacting with the screw-driver cam 93, which is mounted upon the cam-shaft 24. The said rocking frame 91 swings upon pivots 94 94, carried by brackets 95, bolted to the machine-bed 10. The said cam 93 operates to rock the frame 91 forward, its rearward rocking movement being effected by spiral springs 96 96, mounted upon the respective screw-driver shafts 52 52 and housed in two sleeves 97, screwed upon the rear ends of those shafts, as shown in Fig. 11. The rear ends of the two shafts 52 are connected with the rocking frame 91 by means of two ball-bearings 98, each swinging upon two screw-pivots 99, mounted in two yokes 100, Fig. 17, formed at the upper ends of the said arms of the frame. When the said frame is rocked forward, the screw-drivers are engaged with the screws, from which they are disengaged when the frame is rocked rearward. These rocking movements of the frame and the longitudinal movements of the screw-driver shafts do not, however, affect the rotation of the shafts in the manner already described.

After a blank has been brought into registration with the screw-driver and has been engaged and started in rotation thereby it is then pointed by means of a cutter 101, mounted in a box 102, having a heavy stem 103, adjustably mounted in the upper end of one of the two arms 104 of a yoke 105, which is arranged to slide back and forth upon two horizontally-arranged rods 106 106, which pass through the yoke near its base, and the ends of which are supported in arms 107, formed integral with the machine-bed 10. The said yoke 105 is provided with a depending operating-pin 108, which engages with the pointing cutter-cam 109, which is mounted upon the cam-shaft 24. The rearward movement of the yoke is effected by means of a spring 110, encircling a rod 111, the forward end of which is connected with the yoke, while its rear end plays back and forth in a lug 112 on the machine-bed 10, the said spring 110 exerting a constant effort to push the yoke forward. The movement of the cutter 101 will be back and forth in a line parallel with the axis of the combined blank-carrier and back-rest 7. After the blank has been pointed and before the carrier is again moved another step two independent threads are cut in it by means of a thread-cutter 113, which seats the blank firmly upon the bottom of its chamber 7 in the carrier 6 by inward radial pressure, the carrier acting at this time as a back-rest. The said thread-cutter 113 is adjustably mounted in a jaw 114, formed in the upper end of an arm 115, rigidly secured to one of the two corresponding cutter-rods 116, both of which reciprocate as well as oscillate. The rear ends of these cutter-rods are swiveled in the ends of the frame 74, the reciprocation of which, under the action of the springs 78 and the cutter-reciprocating cam 76, causes a corresponding movement back and forth of the cutter-rods, and hence the cutters. The rocking movement of the cutters inward toward the screw-blanks to do their work thereupon and outward from the blanks to clear the same preparatory to being moved longitudinally into position to begin cutting again is produced by oscillating the cutter-rods 116, which is provided for by furnishing each of them with a depending operating-arm 117, to which they are keyed, but through which they are free to reciprocate. These arms are connected at their lower ends by a skeleton or frame-like reach 118, furnished with an antifriction-roll 119, riding upon a cutter-oscillating cam 120, secured to the cam-shaft 24. The said cam 120 is formed with a long space 121, which, so to speak, suspends the operation of the cam during the feeding of a blank, the pointing of another blank, and the ejection of a finished screw. The remaining surface of this cam is divided into ten thread-cutting cam-surfaces separated from each other by deep notches $a$ and differentiated from each other in regular progression in pairs. Thus, beginning at one end of the space 121, the pair $b\ b'$ of the cam-surfaces are exactly alike. The next succeeding pair $c\ c'$ are exactly alike, but shallower than the surfaces $b\ b'$. The pair of surfaces $d\ d'$ are alike, but shallower than the surfaces $c\ c'$. The pair of surfaces $e\ e'$ are alike, but shallower than the surfaces $d\ d'$. The last pair of surfaces $f\ f'$ are exactly alike, but shallower than the surfaces $e\ e'$. In the drawings these surfaces do not, perhaps, appear to be appreciably differentiated from each other, and in the machine itself this differentiation will scarcely be apparent to the naked eye, because so very slight. It will be noted, however, that each surface corresponds to the general contour of one side of a screw. The object of arranging these surfaces in pairs of corresponding surfaces is to provide for cutting two threads in each screw, which is made possible, as before described, by breaking the rotation of the screw-blank by half-turn skips, during which it rests, so that when it begins to rotate again it has, in effect, lost a half-turn, and so presents a new surface to the action of the thread-cutter. Thus the action of the surface $b$ is to cause the cutters to remove a thin chip from each screw-blank, while the action of the surface $b'$ is to remove a corresponding chip from the opposite side of each screw-blank, which side is at this time presented to the cutters, owing to the loss by the screw-blanks of a half-rotation. In other words, the surfaces $b$, $c$, $d$, $e$, and $f$ represent one of the two threads of each screw, and the surfaces $b'$, $c'$, $d'$, $e'$, and $f'$ represent the other of the two threads of each screw.

I may employ any approved cutter; but by preference I shall employ a cutter formed at its end, as shown in Fig. 19, with a V-shaped notch $113^a$, corresponding in form to the cross-section of a screw-thread, and with cutting edges $113^b\ 113^b$, located on opposite sides of the said notch, which, as it were, straddles the rudimentary thread, and finally the finished thread, in such a way as to prevent the swerving of the tool and also in such a way as to prevent the crowding, and therefore the burring, of the threads being cut. With such cutters the threads of the finished screws are left very smooth and perfect. I therefore prefer to employ such cutters, although my machine is perfectly well adapted to be used with single cutters of ordinary construction.

I have spoken of my machine as being adapted for the production of wood-screws each having two threads; but it is also adapted to the production of screws having three or a larger number of threads, for which purpose the annular gears employed for being coupled with the bearing-sleeves of the screw-driving shafts would be provided with three, four, or more clutch-pins instead of with two clutch-pins, as in the machine described. On the other hand, if it were desired to produce single-threaded screws, then the annular gears would be fixed rigidly to the said sleeves, so that the screw-blanks would be continuously rotated without any of the skips provided for in the machine being described.

Although the operation of the machine has been quite fully described in connection with the foregoing detailed description of the mechanism, it may be well to state briefly that the screw-blanks are fed into the hoppers, from which they are passed through the chutes to the positions in line with the feeding-rods, by means of which they are fed into the carriers, which after they have moved twice bring the blanks into registration with the screw-driver of the screw-driver shafts, which now move forward to engage the screw-drivers, with the blanks, which are then rotated, while the pointing-cutters point the blanks. The cam-surface $b$ of the cutter-oscillating cam 120 now operates to effect the oscillation of the cutter-rods 116, so as to bring the cutters 113 into contact with the screw-blanks for beginning the thread near the neck of each. The cutter-reciprocating cam 76 now operates to move the cutters horizontally forward, so as to traverse the length of the shank of each blank, while at the same time the cam-surface $b$ of the cutter-oscillating cam 120 is controlling the position of the cutters with respect to the longitudinal centers of the blanks, which during this time are being radially rotated. When the cutters have passed off the points of the blanks, the antifriction-roll 119 drops into the notch $a$ of the cam 120, permitting the cutters to swing away from the screw-blanks, so as to clear the same. The two springs 79 at once act to retract the cutter-rods; and hence the cutters, which are moved rearward longitudinally into their original positions. The cam-surface $b$ of the cam 120 now acts to oscillate the cutters which are brought into contact with the screw-blanks, but this time at opposite points on the surfaces thereof, for meanwhile the blanks have skipped a half-rotation, owing to the operation of the longitudinally-movable gear-cradles 64 under the control of the cradle-cam 69. The cutter-reciprocating cam 76 now operates to move the cutters forward, while at the same time the cam-surface $b'$ of the cutter-oscillating cam operates to control the position of the cutters with respect to the longitudinal centers of the screw-blanks, from both of which chips are removed exactly like the chips removed in the last preceding operation of the cutters. Two independent threads have now been started upon each blank. The cutters are now drawn back by the operation of the springs 79 79, the screw-blanks are brought into their initial positions with respect to the cutters by again skipping a half-rotation, and the cam-surface $c$ is brought into play for cutting another chip from each of the screw-blanks, so as to deepen each of the rudimentary threads formed by the first cutting action of the cutters. After the completion of this chip the cutters are restored to their starting positions, the screw-blanks skip a half-rotation, and the cam-surface $c'$ is brought into play for cutting another chip from each of the rudimentary threads formed by the action of the cam-surface $b'$. These operations are repeated until the screw-blanks are transformed into finished screws, each of which has had ten chips removed from it in the manner described for the formation of two independent threads, each of which has required the removal of five chips.

It will of course be apparent that the depth of the threads may be varied as desired by the substitution in the machine of different cutter-oscillating cams, while the pitch of the threads may be varied as desired by changing the pitch of the cutter-reciprocating cam 76 or by removing the pinion 87 and replacing it by one having more or fewer teeth, or both the cam 76 and the pinion 87 may be changed, all according to what pitch of screw-thread is desired and to the conditions under which it is desired to produce them. I would therefore have it understood that I do not limit myself to the exact construction herein shown and described, but hold myself at liberty to make such changes and alterations as fairly fall within the spirit and scope of my invention.

Having fully described my invention, what I claim as new, and desire to secure by Letters Patent, is—

1. A screw-machine having a rotatable combined blank-carrier and back-rest consisting of a cylinder formed in its periphery with a plurality of laterally or radially open blank-chambers, and provided at its inner end with a flange through which the said chambers extend, and by means of which the blanks are held in place by their heads and necks while their shanks are being exposed through the laterally open portions of the said chambers for being cut.

2. In a screw-machine, the combination with a horizontally-arranged cylindrical rotatable combined blank-carrier and back-rest formed in its periphery with a series of laterally or radially opening blank-chambers, of an upright carrying the said part, and means for positively feeding blanks into the said chambers in one direction, and positively ejecting the finished screws from the said chambers in the opposite direction.

3. In a screw-machine, the combination with a cylindrical rotatable combined blank-carrier and back-rest, formed at its inner end with an integral flange and provided with a series of blank-chambers extending through the said flange by means of which the blanks are held in place by their heads and necks, and opening laterally or radially outward through the periphery of the body of the blank-rest for the exposure of the shanks of the blanks to a cutting instrumentality.

4. In a screw-machine, the combination with means for supporting and cutting a screw-blank, of instrumentalities for rotating the blank and interrupting its rotation for the presentation of new surfaces to the cutter, whereby a plurality of threads are formed upon the blank.

5. In a screw-machine, the combination with means for supporting and cutting a screw-blank, of instrumentalities for rotating the blank and interrupting its rotation without disconnection therefrom for shifting its surfaces with respect to the thread-cutter, whereby a plurality of threads are formed upon the blank.

6. In a screw-machine, the combination with means for supporting and cutting a screw-blank, of instrumentalities for rotating the blank and interrupting its rotation for the shifting of its surfaces with respect to the thread-cutter, whereby a plurality of threads are formed upon the blank, the said instrumentalities including a longitudinally-movable screw-driver shaft and a clutch mechanism for temporarily releasing the same and hence stopping the blank, after which the shaft is again started in rotation for the rotation of the blank.

7. In a screw-machine, the combination with means for supporting and cutting a screw-blank, of instrumentalities for rotating the blank and interrupting its rotation for shifting its surfaces with respect to the thread-cutter, whereby a plurality of threads are formed upon the blank, the said instrumentalities including a longitudinally-movable screw-driver shaft, a sleeve rotating the shaft and constituting a bearing therefor, an annular gear-wheel mounted upon the sleeve for sliding movement thereupon, means for coupling the gear with the sleeve in different relations thereto, and hence to the shaft, and means for automatically shifting the sleeve.

8. In a screw-machine, the combination with means for supporting and cutting a screw-blank, of instrumentalities for rotating a blank and interrupting its rotation for shifting its surfaces with respect to the thread-cutter, whereby a plurality of threads are formed upon the blank, the said instrumentalities including a longitudinally-movable screw-driver shaft, a sleeve rotating the shaft and constituting a bearing therefor, an annular gear-wheel mounted upon the sleeve for sliding movement thereupon, means for coupling the gear with the sleeve in different relations thereto, a cradle receiving the annular gear, and means for automatically moving the cradle back and forth for shifting the gear to couple it with the sleeve in different relations thereto.

9. In a screw-machine, the combination with means for supporting and cutting a screw-blank, of instrumentalities for rotating the blank and interrupting its rotation for shifting its surfaces with respect to the thread-cutter, whereby a plurality of threads are formed upon the blank, the said instrumentalities including a longitudinally-movable screw-driver shaft, a sleeve rotating the shaft, and constituting a bearing therefor, an annular gear-wheel mounted upon the sleeve and provided upon its opposite faces with clutch-pins, located diagonally opposite each other, clutch-pins connected with the sleeve and located directly opposite each other, and means for moving the gear to engage its clutch-pins with those of the sleeve.

10. In a screw-machine, the combination with means for supporting and cutting a screw-blank, of instrumentalities for rotating the blank and interrupting its rotation for shifting its surfaces with respect to the thread-cutter, whereby a plurality of threads are formed upon the blank, the said instrumentalities including a longitudinally-movable screw-driver shaft, means connected with the said shaft for rotating it and for interrupting its rotation, a rocking frame connected with the rear end of the screw-driver shaft for moving the same longitudinally, and means for rocking the frame.

11. In a screw-machine, the combination with a combined carrier and back-rest, of a thread-cutter, a longitudinally-movable screw-driver shaft, and means for rotating the said shaft and interrupting its rotation for shifting the surfaces of the blank with respect to the cutter, whereby a plurality of threads are formed upon the blank, the said means including a longitudinally-movable annular gear-wheel, a cradle in which the same is mounted, a cradle-cam for actuating the cradle, a ratchet-wheel for actuating the cam, a pawl for actuating the ratchet-wheel, and means for moving the pawl back and forth.

12. In a screw-machine, the combination with a cylindrical combined blank-carrier and back-rest formed with laterally or radially open peripheral blank-chambers, mechanism for actuating the same in step-by-step rotation, means for rotating the blanks in the said chambers, a thread-cutter for threading the laterally-exposed portions of the blanks, and a pointing-cutter located adjacent to the outer end of the said combined blank-carrier and back-rest, and moving in a line parallel with the axis thereof for pointing the projecting ends of the blanks.

13. In a screw-machine, the combination with a horizontally-arranged cylindrical combined blank-carrier and back-rest having a series of blank-chambers each opening laterally outward through the periphery of its body portion, of means for feeding the blanks into the said chambers in one direction, and means for positively ejecting the finished screws from the said chambers in the opposite direction.

14. In a screw-machine, the combination with a combined blank-carrier and back-rest, of means for feeding screw-blanks thereinto in one direction, and for ejecting the finished screws therefrom in the opposite direction, and means for connecting the said feeding and ejecting instrumentalities, whereby they are caused to operate simultaneously in the opposite directions.

15. In a screw-machine, the combination with a thread-cutter, of means for supporting a screw-blank, instrumentalities for rotating the blank and interrupting its rotation for the presentation of new surfaces to the cutter, a cutter-rod for carrying the said cutter, means for moving the said rod longitudinally to move the cutter lengthwise with respect to the screw-blank, a cam provided with a series of cam-surfaces arranged in groups of corresponding cam-surfaces, and means for transmittting the action of the said cam-surfaces to the cutter-rod and cutter, whereby corresponding chips are removed from different portions of a screw-blank as the same is intermittently rotated.

16. In a screw-machine, the combination with a thread-cutter, of means for supporting a screw-blank, instrumentalities for rotating the blank and interrupting its rotation for the presentation of new surfaces to the cutter, a cutter-rod for carrying the said cutter, means for moving the said rod longitudinally to move the cutter lengthwise with respect to the screw-blank, a cam for oscillating the cutters, provided with a series of cam-surfaces arranged in pairs of corresponding cam-surfaces the pairs of which are shaped to progressively increase the oscillation of the cutter and hence the depth of the threads cut thereby, and means for transmitting the action of the said cam-surfaces to the cutter-rod and cutter.

17. In a double screw-machine, the combination with two sets of blank-feeding, blank-rotating, thread-cutting and finished-screw-ejecting instrumentalities, of a rocking head connecting the blank-rotating instrumentalities for moving them longitudinally, means for rocking the said head, means for rotating the said blank-rotating instrumentalities and for interrupting their rotation, including two annular gear-wheels, means for driving the said gear-wheels, two cradles for shifting the said gear-wheels, a cradle-cam for operating the said cradles simultaneously, and means for driving the said cam.

In testimony whereof I have signed this specification in the presence of two subscribing witnesses.

JOSEPH P. LAVIGNE.

Witnesses:
FREDERIC C. EARLE,
GEORGE D. SEYMOUR.